US009742778B2

United States Patent
O'Sullivan et al.

(10) Patent No.: US 9,742,778 B2
(45) Date of Patent: Aug. 22, 2017

(54) DIFFERENTIAL SECURITY POLICIES IN EMAIL SYSTEMS

(75) Inventors: Patrick J. O'Sullivan, Dublin (IE); Liam Harpur, Dublin (IE); Barry E. Willner, Briarcliff Manor, NY (US); Edith H. Stern, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1251 days.

(21) Appl. No.: 12/555,978

(22) Filed: Sep. 9, 2009

(65) Prior Publication Data

US 2011/0061089 A1    Mar. 10, 2011

(51) Int. Cl.
*H04L 29/06* (2006.01)

(52) U.S. Cl.
CPC ........ *H04L 63/102* (2013.01); *H04L 63/1416* (2013.01); *H04L 63/10* (2013.01)

(58) Field of Classification Search
CPC .............................. H04L 63/10; H04L 63/102
USPC .............................. 726/23–26; 713/166, 189
See application file for complete search history.

(56) References Cited

U.S. PATENT DOCUMENTS

| | | | |
|---|---|---|---|
| 5,950,172 A | | 9/1999 | Klingman |
| 5,958,051 A | * | 9/1999 | Renaud et al. ................. 726/22 |
| 5,987,149 A | | 11/1999 | Poor |
| 5,991,758 A | | 11/1999 | Ellard |
| 6,516,421 B1 | * | 2/2003 | Peters ................. H04W 52/027 713/320 |
| 7,996,374 B1 | * | 8/2011 | Jones et al. .................... 707/694 |
| 8,020,210 B2 | * | 9/2011 | Tippett .................. G06F 21/577 726/23 |
| 8,117,659 B2 | * | 2/2012 | Hartrell et al. .................. 726/24 |
| 2004/0186989 A1 | * | 9/2004 | Clapper .............. G06F 21/6281 713/151 |
| 2005/0086502 A1 | * | 4/2005 | Rayes et al. .................... 713/189 |
| 2005/0097320 A1 | * | 5/2005 | Golan et al. .................. 713/166 |
| 2005/0144480 A1 | * | 6/2005 | Kim .................... H04L 63/1433 726/4 |

(Continued)

FOREIGN PATENT DOCUMENTS

| | | |
|---|---|---|
| CN | 101073219 A | 11/2007 |
| JP | 2003-150748 A | 5/2003 |

(Continued)

OTHER PUBLICATIONS

Marcos Forte et al., A content classification and filtering server for the Internet, Apr. 23-27, 2006, ACM, pp. 1166-1171.*

(Continued)

*Primary Examiner* — Kari Schmidt
*Assistant Examiner* — Fahimeh Mohammadi
(74) *Attorney, Agent, or Firm* — Charles L. Moore; Moore & Van Allen PLLC (57) ABSTRACT

A differential message security policy includes receiving information regarding activities of a user, determining a security risk for the user based on the activities of the user, and setting a security policy for the user based on the security risk. The security policy of the user may be modified based on a change in the security risk of the user or the security risk of the user exceeding a predetermined level. The security risk may be determined based on an aggregated scoring system that uses security variables related to the activities of the user.

15 Claims, 4 Drawing Sheets

(56) References Cited

U.S. PATENT DOCUMENTS

| | | | |
|---|---|---|---|
| 2006/0129644 A1* | 6/2006 | Owen | G06Q 10/107 709/206 |
| 2006/0179484 A1* | 8/2006 | Scrimsher et al. | 726/23 |
| 2006/0195905 A1* | 8/2006 | Fudge | 726/25 |
| 2006/0206941 A1* | 9/2006 | Collins | 726/25 |
| 2007/0081636 A1* | 4/2007 | Shaffer | G06Q 10/107 379/80 |
| 2007/0094265 A1* | 4/2007 | Korkus | 707/9 |
| 2007/0112764 A1* | 5/2007 | Yih | G06F 17/241 |
| 2007/0143851 A1* | 6/2007 | Nicodemus et al. | 726/25 |
| 2008/0229421 A1* | 9/2008 | Hudis et al. | 726/25 |
| 2009/0100138 A1* | 4/2009 | Harris | G06Q 10/107 709/206 |
| 2009/0138972 A1* | 5/2009 | Scales | G06F 21/56 726/24 |
| 2009/0164572 A1* | 6/2009 | Charlton | G06Q 30/02 709/204 |
| 2009/0172772 A1* | 7/2009 | Souille | G06F 21/552 726/1 |
| 2010/0031343 A1* | 2/2010 | Childress et al. | 726/18 |
| 2010/0125911 A1* | 5/2010 | Bhaskaran | G06Q 10/10 726/23 |
| 2010/0125912 A1* | 5/2010 | Greenshpon | H04L 63/1433 726/25 |
| 2010/0287597 A1* | 11/2010 | Richins et al. | 726/1 |
| 2011/0041076 A1* | 2/2011 | Sinn et al. | 715/745 |

FOREIGN PATENT DOCUMENTS

| | | |
|---|---|---|
| JP | 2008-129648 A | 6/2008 |
| JP | 2011-008669 A | 1/2011 |
| WO | 2008004498 A1 | 1/2008 |

OTHER PUBLICATIONS

Salvatore J. Stolfo et al., Behavior-Based Modeling and Its Application to Email Analysis, May 2006, ACM, vol. 6 Issue 2, pp. 187-221.*

Jan. O. Aagedal, Model-based Risk Assessment to Improve Enterprise Security, Sep. 20-20, 2002, IEEE, pp. 1-12.*

Yuan Hua et al., Impact of Information Security Policies on Email-Virus Propagation, Dec. 2005, IEEE, vol. 10 Issue S1, pp. 803-810.*

* cited by examiner

DIFFERENTIAL SECURITY POLICIES IN EMAIL SYSTEMS

BACKGROUND

Aspects of the present invention relate to electronic systems, and more specifically to differential security policies in electronic systems.

In today's collaborative world where it is easy to transfer information, there is a greater need to put safeguards in place to protect personal and other confidential information. For example, a company may be open to lawsuits or lose competitive advantage if confidential information is "lost".

BRIEF SUMMARY

According to one aspect of the present invention, a method, operable on a server, for differential message security policies that includes receiving, by the server, information regarding activities of a user, determining, by the server, a security risk for the user based on the activities of the user, and setting, by the server, a security policy for the user based on the security risk.

According to another aspect of the present invention, a computing device for differential message security policies that includes an input interface, the input interface being configured to receive information regarding activities of a user, and a processor, the processor configured to determining a security risk for the user based on the activities of the user and set a security policy for the user based on the security risk.

According to a further aspect of the present invention, a computer program product includes a computer readable storage medium having computer readable program code embodied therewith, the computer readable storage medium including computer readable program code configured to receive information regarding activities of a user, computer readable program code configured to determine a security risk for the user based on the activities of the user, and computer readable program code configured to set a security policy for the user based on the security risk.

BRIEF DESCRIPTION OF THE SEVERAL VIEWS OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations of the present invention may be written in an object oriented, scripted or unscripted programming language such as Java, Perl, Smalltalk, C++ or the like. However, the computer program code for carrying out operations of the present invention may also be written in conventional procedural programming languages, such as the "C" programming language or similar programming languages.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operations to be performed on the computer or other programmable apparatus to produce a computer implemented process such that the instructions which execute on the computer or other programmable apparatus provide steps for implementing the functions/acts specified in the flowchart and/or block diagram block or blocks. Alternatively, computer program implemented steps or acts may be combined with operator or human implemented steps or acts in order to carry out an embodiment of the invention.

According to embodiments of the present invention, aggregated scoring is provided that allows a security policy for a user to be changed if the security risk of the user is deemed to have exceeded a predetermined level. In embodiments according to the present invention, a security policy may be modified, for example, to change password strength, a frequency of virus scans, a window for applying patches, to require that a laptop must remain on site, a sleep time between interactions, etc. The security risk may be based on many different variables such as, for example, a rank of the user in the organization, who the user communicates with, patterns of behavior of the user, a number and level of confidential interactions of the user, etc. The scoring system may be represented by a graph equalization user interface to help with the analysis and scoring of an individual for security purposes. An administrator or manager may use the graph equalization user interface to increase or decrease the relative rating of the security variables. For example, a first user A that works in human resources and deals with a lot of sensitive information may be required to change their passwords more often than a second user B who works in the maintenance department and never deals with sensitive information.

Therefore, according to embodiments of the present invention, users that may be at a higher security risk and/or have or may be exposed to a lot of sensitive communications and information may be required to change their security, for example, passwords, on a periodic basis that may be much more frequent than other users that do not handle much sensitive information or have many sensitive communications. Thus, a differentiated security policy based on the scoring of each individual's security exposure may be implemented, for example, in a messaging system or server. Thus, system security is improved and a company or organization has less exposure to law suits and/or intellectual property loss due to secure information or communications being leaked.

Embodiments according to the present invention may be implemented on a server, a centralized system, a client side system, a client device, or any combination thereof. A user, business, organization, etc. may configure differential security policies in their messaging systems to be enabled or not to be enabled, or under what circumstances to be enabled. For example, messaging systems differential security policies functionality may be enable to by scan all messages and other specific entries but not enabled to check word documents on the user's computer. If the functionality is enabled, this allows scoring of an individual's/entities security risk so that it may be used to possibly motivate a security change for the individual/entity.

To help illustrate embodiments of the present invention, an electronic system comprising an email system will be used however embodiments of the present invention are not limited to these type systems. Embodiments of the present invention may be implemented in many types of systems, environments and applications such as, for example, instant messaging, web conferencing, etc. or any other system/application where it is desired to determine a security risk for a user based on the activities of the user and set a security policy for the user based on the security risk and have the ability to modify the security policy of the user based on a change in the security risk of the user or the security risk of the user exceeding a predetermined level.

According to embodiments of the present invention, when a user sends or receives a message, a server or system may scan the message, analyze the result of the scan, and use the analysis to help build a security score for the user. The score may be based on any of many different variables such as, for example, the number of confidential messages, a relationship of the user to persons that have a high security score, a linguistic analysis of the message, keyword matching, roll and level of the user within the organization, a degree of personal activity overlap of the user on company devices and/or time, etc. If a user contacts or has a relationship with a person that is an employee of the company, the employee may have a low security score. In contrast, if the person is employed by another company or a competitor, the person may have a high security score. Communications and relationships of the user with this person having a high security score increases the security score of the user. Further, linguistic analysis may include analysis of the content of the messages where words may be parsed and analyzed.

The score may be a dynamically changing score and may be likely to become more accurate over time as more security related information is obtained regarding a specific user. After the scoring of an individual's or entity's security risk, then that score may be used for a myriad of reasons such as, for example, to possibly motivate a security change for the user or entity.

In embodiments according to the present invention, environmental factors may also be taken into account in assessing a security change or risk of a user. For example, potential hacking or probing of the users or enterprise may be factored in. If an individual or enterprise is frequently the target of hacking (e.g., entering the user id and incorrect password) the user or entity may be asked to change their associated passwords with greater frequency. Further, if an enterprise, work group, or other is targeted these same factors may be used.

According to another embodiment of the present invention, a random factor may be used along with the factors previously mentioned in determining the security settings for a user (e.g., when a password should be changed). If a user's behavior is consistent, a user may be required to routinely change their password. In contrast, a user may be required to randomly change their password. A random factor may be used in addition with the other factors to determine how randomly to change their password.

Moreover, according to embodiments of the present invention, the application of the false negatives technique may be used. For example, a false negative threshold may be adjusted based on all or any of the previous criteria mentioned. A false negative occurs when a user correctly authenticates (uses the correct password) and the system tells the user that he did not correctly authenticate and to reenter. For example, a user may type a user id and the correct password and the system may respond "authentication denied please reenter". As the system may give one more false negative, a potential user who thinks he has the correct id and password will be told he does not. While hackers may overcome this by multiple trials, this greatly burdens the hacking process. If a false negative threshold is, for example, three, a hacker trying one million combinations would have to try each one four times. A threshold of "too many" attempts may also be used. A false negative threshold is the maximum number of false negatives that might occur. According to embodiments of the present invention, the false negative threshold may be raised for those users whose security is deemed at risk.

Figure 1:
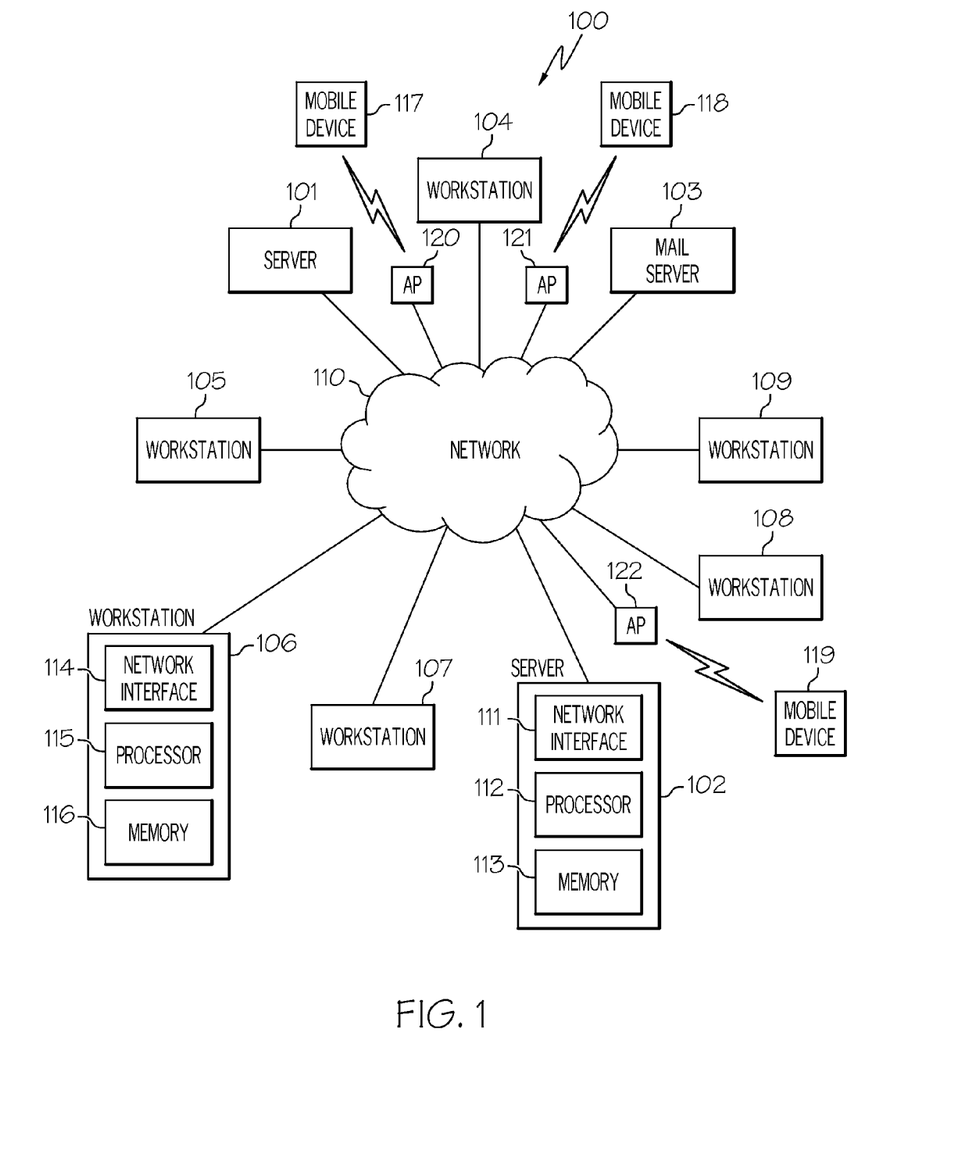
FIG. 1 is a system for differential security policies according to an exemplary embodiment of the present invention.

FIG. 1 shows a system for differential security policies according to an exemplary embodiment of the present invention. A system 100 may include one or more servers 101, 102, one or more mail servers 103, one or more wireless devices 117-119, and one or more workstations 104-109, where the servers 101, 102, wireless devices 117-119, and workstations 104-109 may be interconnected via a network 110. The wireless devices 117-119 may access the network 110 via one or more access points 120-122 or by any other method. The wireless devices 117-119 may be any type of wireless device such as, for example, a mobile phone, a personal digital assistant (PDA), a portable game system, a laptop computer, etc. The network 110 may be the Internet, an intranet, a local area network, a wide area network, or any other type of network. Each server 101, 102, 103 may include a network interface 111, a processor 112, a memory 113, and other elements normally associated with a server. Similarly, each workstation 104-109 may include a network interface 114, a processor 115, and memory 116, and other items normally associated with a workstation. A processor 112 of each server 101, 102, 103 or a processor 115 of each workstation 104-109 may be configured to determine a security risk for the user based on the activities of the user and set a security policy for the user based on the security risk.

A processor 112 of each server 101, 102, 103 or a processor 115 of each workstation 104-109 may be configured to determine the security risk based on an aggregated scoring system that uses security variables related to the activities of the user. A processor 112 of each server 101, 102, 103 or a processor 115 of each workstation 104-109 may also be configured to modify the security policy of the user based on a change in the security risk of the user or the security risk of the user exceeding a predetermined level.

The security risk may be determined based on an aggregated scoring system that uses security variables related to the activities of the user. The securities variables may include a level of the user in an organization, a role of the user in an organization, people the user communicates with, organizations the user communicates with, patterns of behavior of the user, a number of confidential interactions, a level of confidential interactions, number of confidential messages, relationship to persons having a high security risk, linguistic analysis of mail and messages received by the user, a degree of personal activity of the user that occurs on devices of an organization, a degree of personal activity of the user that occurs on an organization's time, a random factor, a frequency that the user has been the target of hacking, a frequency that an organization of the user has been the target of hacking, or a frequency that a group that the user belongs to has been the target of hacking. A relative weight may be assigned to each security variable.

Figure 2:
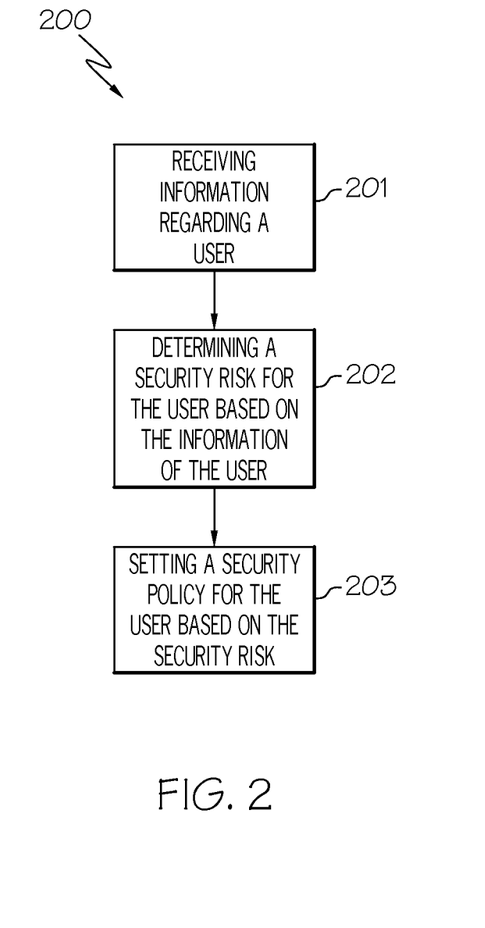
FIG. 2 is a flowchart of a process for differential security policies according to an exemplary embodiment of the present invention.

FIG. 2 shows a flowchart of a process for differential security policies according to an exemplary embodiment of the present invention. In the system 200, in block 201, information regarding a user may be received. In block 202, a security risk for the user may be determined based on the information of the user. In block 203, a security policy may be set for the user based on the security risk.

Figure 3:
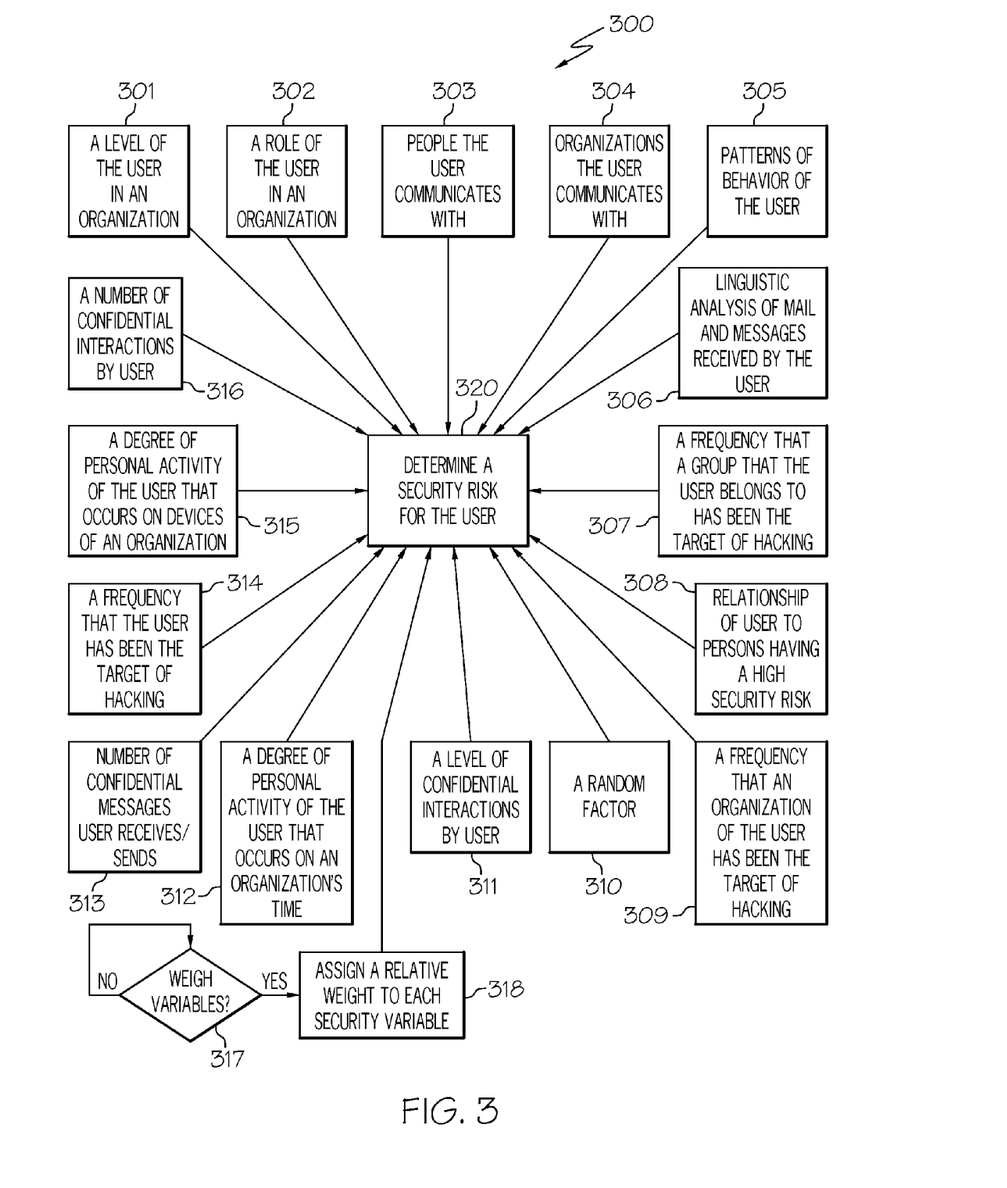
FIG. 3 is a flowchart of a process for differential security policies according to another exemplary embodiment of the present invention.

FIG. 3 shows a flowchart of a process for differential security policies according to another exemplary embodiment of the present invention. In the process 300, in block 320, a security risk for a user may be determined. This security risk may be determined based on one or more of various factors. For example, a security risk for a user may be determined based on: in block 301 a level of the user in an organization, in block 302 a role of the user in the organization, in block 303 people the user communicates with, in block 304 organizations the user communications with, in block 305 patterns of behavior of the user, in block 306 linguistic analysis of mail and messages received by the user, in block 307 a frequency that a group that the user belongs to has been the target of hacking, in block 308 a relationship of the user to persons having a higher security risk, in block 309 a frequency that an organization of the user has been the target of hacking, in block 310 a random factor, in block 311 a level of confidential interactions by the user, in block 312 a degree of personal activity of the user that occurs on an organization's time, in block 313 a number of confidential messages the user receives and/or sends, in block 314 a frequency that the user has been the target of hacking, in block 315 a degree of personal activity of the user that occurs on devices of an organization, in block 316 a number of confidential interactions by the user, etc.

Further, in block 317 it may be determined whether a weighting factor is applied to one or more of the various factors and if so, then in block 318, a relative weight may be assigned to one or more of each security variable. A higher weighting causes the specific variable to have more of an influence on a security risk of the user and therefore, a security policy of the user.

Figure 4:
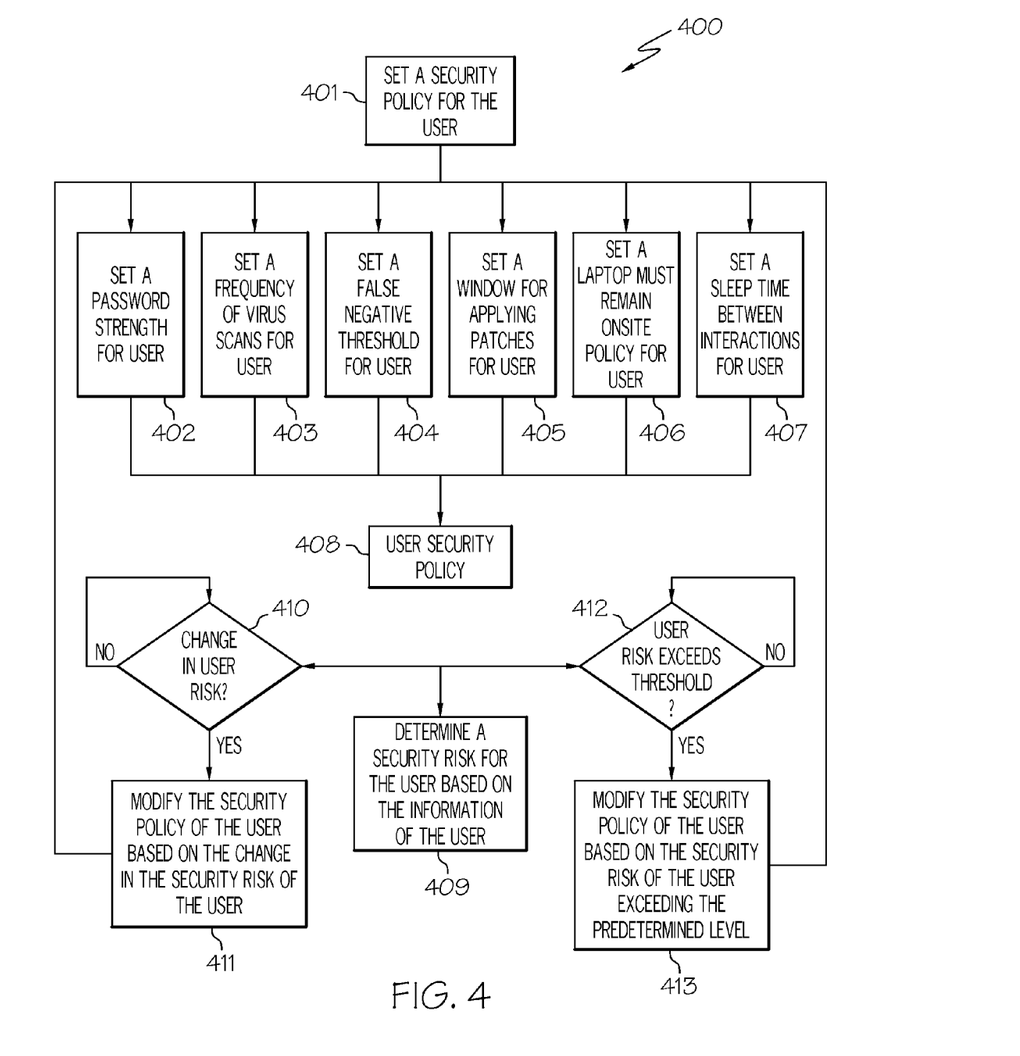
FIG. 4 is a flowchart of a process for differential security policies according to a still further exemplary embodiment of the present invention.

FIG. 4 shows a flowchart of a process for differential security policies according to a still further exemplary embodiment of the present invention. In the process 400, in block 401 a security policy may be set for a user. This may include any of many different factors that may comprise the security policy. For example, in block 402, a password strength may be set for the user. In block 403, a frequency of virus scans may be set for a user. In block 404, a false negative threshold may be set for the user. In block 405, a window for applying patches for software of tools used by the user may be set. In block 406, a laptop must remain onsite policy may be set for the user therefore, not allowing the user to remove a laptop from a company's facilities. In block 407, a sleep time between interactions may be set for the user. These factors and other factors may be used for setting, in block 408, a user security policy.

Further, in block 409, a security risk may be determined for a user based on the information of the user. Then in block 410, it may be determined whether there has been a change in the user's risk and if not, the process ends. If it is desired to change the user risk for the user, then in block 411, the security policy of the user may be modified based on the change in the security risk of the user and the process returns to blocks 402-407 where various parameters may be set in order to generate the security policy of the user. Further, after a security risk for a user has been determined, then in block 412, it may be determined whether the user risk exceeds a defined threshold and if not, the process ends. If the user risk has exceeded a defined threshold then in block 413 the security policy of the user may be modified based on the security risk of the user exceeding the predetermined level and the process returns to blocks 402-407 where various parameters may be set and factored into generating, in block 408, the user security policy.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method, operable on a server, for differential message security policies, each message including content, comprising:
    scanning, by the server, the content of one or more messages sent or received by a user;
    performing linguistic analysis, keyword matching, or a combination thereof of the content of the one or more messages to acquire information regarding activities of the user;
    analyzing, by the server, the information regarding activities of the user;
    determining, by the server, a security risk for the user based on the information regarding activities of the user and based on an aggregated scoring system that uses security variables related to the activities of the user;
    assigning with a graph equalization user interface, by the server, a relative weight to each security variable;
    setting, by the server, a security policy for the user based on the security risk; and
    performing, by the server, an action based on setting the security policy for the user, the action comprising at least one of setting a password strength for the user; setting a frequency of virus scans for the user; setting a false negative threshold for the user; setting a window for applying patches for the user; or setting a sleep time between interactions for the user.

2. The method according to claim 1, further comprising modifying, by the server, the security policy of the user based on a change in the security risk of the user.

3. The method according to claim 1, further comprising modifying, by the server, the security policy of the user based on the security risk of the user exceeding a predetermined level.

4. The method according to claim 1, wherein the securities variables comprise at least one of a level of the user in an organization, a role of the user in an organization, people the user communicates with, organizations the user communicates with, patterns of behavior of the user, a number of confidential interactions, a level of confidential interactions, number of confidential messages, relationship to persons having a high security risk, a degree of personal activity of the user that occurs on devices of an organization, a degree of personal activity of the user that occurs on an organization's time, and a random factor.

5. The method according to claim 1, wherein the securities variables comprise at least one of a frequency that the user has been the target of hacking, a frequency that an organization of the user has been the target of hacking, and a frequency that a group that the user belongs to has been the target of hacking.

6. The method according to claim 1, wherein the security policy comprises at least one of a sleep time between interactions and a false negative threshold.

7. A computing device for differential message security policies, each message including content, comprising:
    an input interface, the input interface being configured to scan the content of one or more messages sent or received by a user to acquire information regarding activities of the user; and
    a server processor device or workstation processor device, the processor device configured to perform a linguistic analysis, keyword matching, or a combination thereof of the content of the one or more messages, analyze the information regarding activities of the user, determine a security risk for the user based on the information regarding activities of the user and based on an aggregated scoring system that uses security variables related to the activities of the user, assign a relative weight to each security variable with a graph equalization user interface, and set a security policy for the user based on the security risk; and
    wherein an action is performed based on the security policy being set for the user, the action comprising at least one of setting a password strength for the user; setting a frequency of virus scans for the user; setting a false negative threshold for the user; setting a window for applying patches for the user; or setting a sleep time between interactions for the user.

8. The computing device according to claim 7, further comprising the processor device determining the security risk based on an aggregated scoring system that uses security variables related to the activities of the user.

9. The computing device according to claim 7, further comprising a storage device, the storage device storing at least one of the security policy of the user and security policies of at least one other user.

10. The computing device according to claim 7, wherein the computing device comprises one of a server, a client device, an email system, a web conferencing system and a messaging system.

11. The computing device according to claim 7, further comprising modifying the security policy of the user based on at least one of a change in the security risk of the user and the security risk of the user exceeding a predetermined level.

12. The computing device according to claim 7, wherein the securities variables comprise at least one of a level of the user in an organization, a role of the user in an organization, people the user communicates with, organizations the user communicates with, patterns of behavior of the user, a number of confidential interactions, a level of confidential interactions, number of confidential messages, relationship to persons having a high security risk, a degree of personal activity of the user that occurs on devices of an organization, a degree of personal activity of the user that occurs on an organization's time, a random factor, a frequency that the user has been the target of hacking, a frequency that an organization of the user has been the target of hacking, and a frequency that a group that the user belongs to has been the target of hacking.

13. A computer program product comprising a non-signal propagating computer readable storage medium having computer readable program code embodied therewith, the computer readable storage medium comprising:
   computer readable program code configured to scan content of one or more messages sent or received by a user;
   computer readable program code configured to perform linguistic analysis, keyword matching, or a combination thereof of the content of the one or more messages to acquire information regarding activities of the user;
   computer readable program code configured to analyze the information regarding activities of the user;
   computer readable program code configured to determine a security risk for the user based on the information regarding activities of the user and based on an aggregated scoring system that uses security variables related to the activities of the user;
   computer readable program code configured to assign a relative weight to each security variable with a graph equalization user interface;
   computer readable program code configured to set a security policy for the user based on the security risk; and
   computer readable program code configured to perform an action based on the security policy being set for the user, the action comprising at least one of setting a password strength for the user; setting a frequency of virus scans for the user; setting a false negative threshold for the user; setting a window for applying patches for the user; or setting a sleep time between interactions for the user.

14. The computer readable storage medium according to claim 13, further comprising computer readable program code configured to modify the security policy of the user based on at least one of a change in the security risk of the user and the security risk of the user exceeding a predetermined level.

15. The computer readable storage medium according to claim 13, wherein the securities variables comprise at least one of a level of the user in an organization, a role of the user in an organization, people the user communicates with, organizations the user communicates with, patterns of behavior of the user, a number of confidential interactions, a level of confidential interactions, number of confidential messages, relationship to persons having a high security risk, a degree of personal activity of the user that occurs on devices of an organization, a degree of personal activity of the user that occurs on an organization's time, and a random factor.

* * * * *